Figure 1:
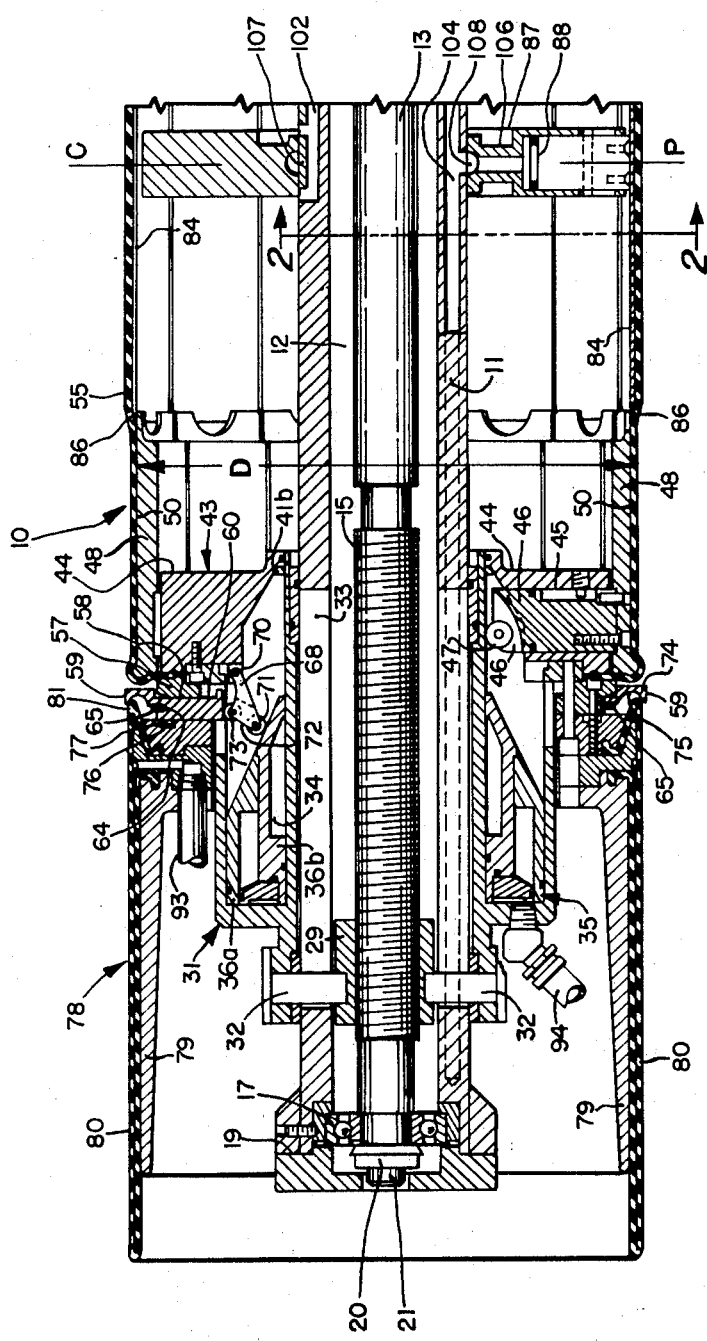

United States Patent [19]
Felten

[11] 3,816,218
[45] June 11, 1974

[54] TIRE BUILDING DRUM

[75] Inventor: Gilbert A. Felten, Kehlen, Luxembourg

[73] Assignee: The Goodyear Tire & Rubber Company, Akron, Ohio

[22] Filed: Mar. 29, 1972

[21] Appl. No.: 239,145

[52] U.S. Cl.............. 156/398, 156/401, 156/416, 156/417
[51] Int. Cl...................... B29h 17/16, B29h 17/22
[58] Field of Search ........... 156/400, 401, 398, 415, 156/416, 417, 414, 132, 135

[56] References Cited
UNITED STATES PATENTS

| | | | |
|---|---|---|---|
| 3,035,629 | 5/1962 | Vanzo et al. | 156/415 X |
| 3,184,361 | 5/1965 | Allitt | 156/415 |
| 3,188,260 | 6/1965 | Nebout | 156/401 X |
| 3,237,199 | 2/1966 | Breg | 156/398 |
| 3,265,549 | 8/1966 | Woodhall | 156/401 X |
| 3,418,192 | 12/1968 | Nadler | 156/417 X |
| 3,698,987 | 10/1972 | Woodhall et al. | 156/401 |

Primary Examiner—Clifton B. Cosby
Attorney, Agent, or Firm—F. W. Brunner; M. L. Gill

[57] ABSTRACT

A tire building machine including a drum having a set of radially movable segments at each end thereof and being covered with a cord reinforced rubber sleeve, a set of radially movable fingers are disposed adjacent the axially outer ends of the drum and an auxiliary drum including a turn-up bladder is disposed axially outwardly of each set of fingers. The drum is axially contractible and radially expansible A pair of coaxially arranged pistons each having a conical surface is associated with each set of fingers and segments on each end of the drum for moving the fingers into gripping relation with and a tire bead with a predetermined force and for moving the segments to a predetermined diameter.

The foregoing abstract is not to be taken as limiting the invention of this application, and in order to understand the full nature and extent of the technical disclosure of this application, reference must be made to the accompanying drawings and the following detailed description.

20 Claims, 6 Drawing Figures

TIRE BUILDING DRUM

This invention relates to tire building machines, and more particularly to improvements in tire building machines for building radial belted tires.

An object of the present invention is to provide a tire building machine which will provide increased accuracy in the location of the various components of the tire, particularly the beads, during the building process.

It is a further object of the present invention to provide such a tire building machine which will securely grip and hold the bead portions of the tire and at the same time automatically adjust to accommodate slight variations in bead diameter or variations in the thickness of the ply structure wrapped about the beads.

It is still a further object of the present invention to provide a tire building machine which is expansible from a first cylindrical diameter to a second predetermined cylindrical diameter and having radially expandable rigid bead gripping means which exert a predetermined radial force on the tire beads.

Other objects will be in part apparent and in part pointed out more in detail hereinafter.

The invention accordingly comprises the features of construction, combination of elements and arrangement of parts which will be exemplified in the construction hereafter set forth and the scope of the application of which will be indicated in the appended claims.

Figure 1A:
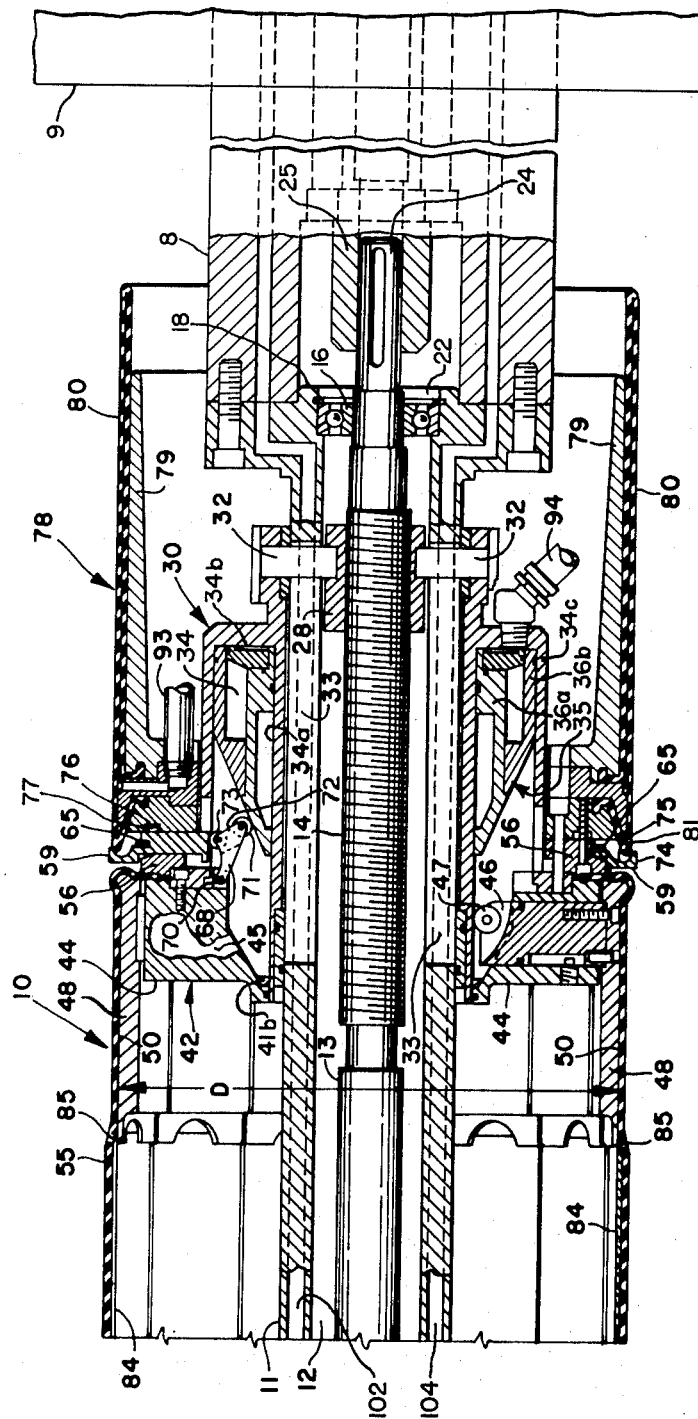
Figure 2:
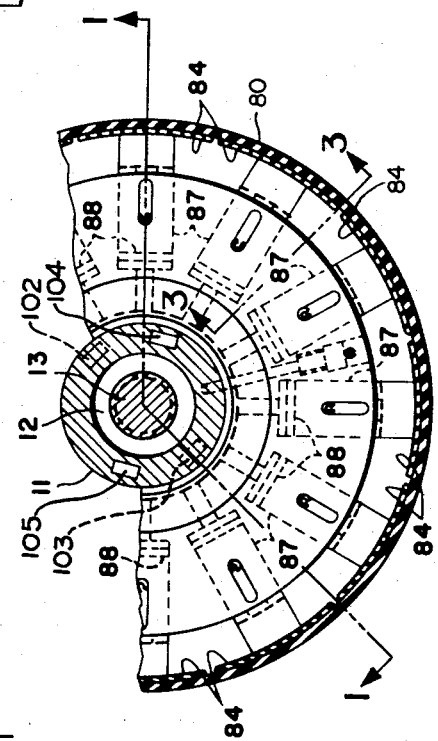
Figure 3:
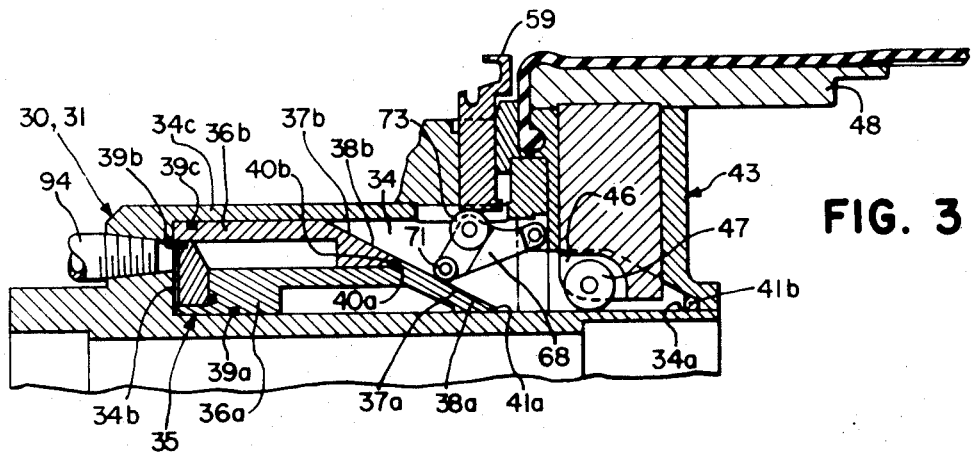
Figure 4:
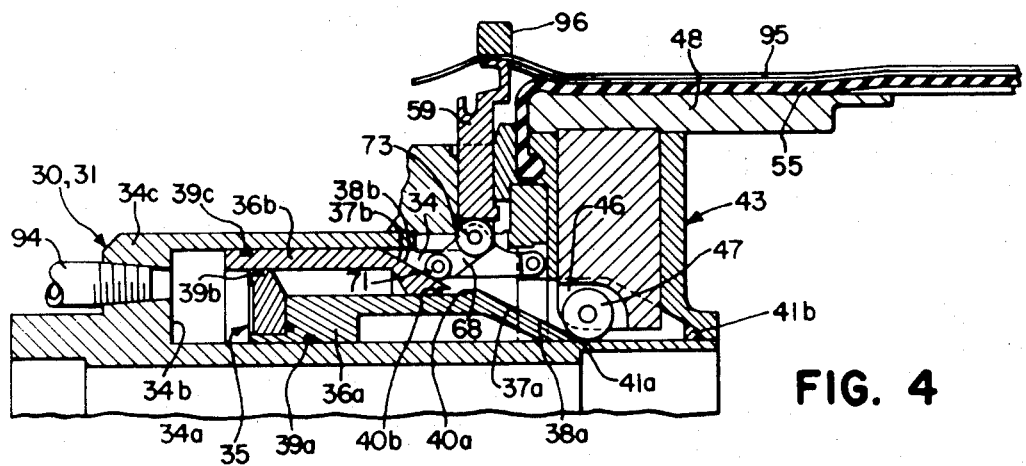
Figure 5:
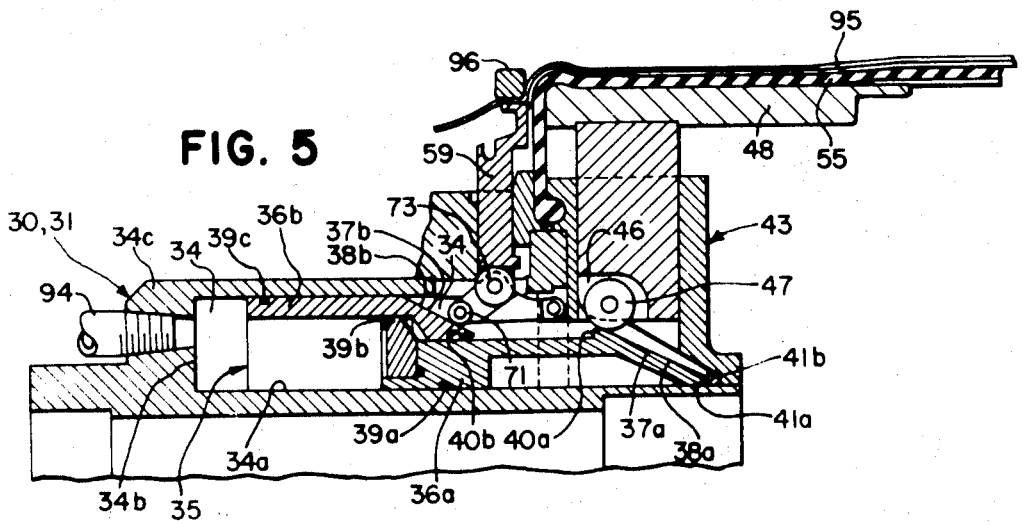

In the drawings:

FIG. 1–1A is a longitudinal, partially offset cross-sectional view, taken substantially along the lines 1—1 of FIG. 2, of a building machine constructed in accordance with the invention;

FIG. 2 is a section of the drum of FIG. 1 viewed substantially from the line 2—2 of FIG. 1; and FIGS. 3, 4 and 5 are partial sectional views of a portion of the machine of FIG. 1–1A taken substantially along line 3—3 of FIG. 2 and illustrating sequential movements of the cam mechanism of the present invention.

Referring generally to the drawings, and more particularly to FIGS. 1–1A, there is shown a building machine comprising a drum 10 which in turn comprises an elongated hollow shaft 11 having an axial bore 12. A drive screw 13 with a pair off oppositely threaded portions 14 and 15, is centrally disposed within the bore 12 of the shaft 11. The drive screw 13 is journalled in a pair of bearings 16 and 17 disposed at adjacent inboard and outboard ends 18 and 19, respectively, of the drum shaft 11, for rotation about the longitudinal axis of the building drum 10, which coincides with the longitudinal axes of the drum shaft 11 and drive screw 13. A washer and nut assembly 20 is mounted on the outboard end 21 of the drive screw 13 for preventing axial movement of the drive screw 13 in the bore 12.

The inboard end 24 of the drive screw 13 protrudes from the building drum 10 for coupling engagement with a drive shaft 25 for rotating the drive screw 13 to axially expand and contract the drum 10. The shaft 25 is cantilever supported on the main housing or head stock 9 of the tire building machine of which the drum 10 is a part. A drive shaft 8 disposed coaxially about the drive shaft 25 also extends in cantilever fashion from the head stock 9 and is fixed to a flange at one end of the drum shaft 11 to support the drum and to rotatably drive the same.

A pair of nuts 28 and 29 are threadably mounted on the threaded portions 14 and 15 of the drive screw 13 for movement along the longitudinal axis of the building drum 10 in response to rotation of the drive screw 13. A pair of annular hubs 30 and 31 are slidably mounted on the drum shaft 11 for movement coaxially thereof and are keyed by sets of similar pins 32 to the nuts 28 and 29. The pins 32 extend through and are slidable in slots 33 in the shaft 11 which extend parallel to the rotational axis of the shaft 11. The pins thus prevent rotation of the hubs 30, 31 and nuts 28, 29 about the shaft 11. The hubs 30 and 31 are equally spaced from the centerplane CP of the drum 10. The centerplane of the drum is a plane disposed midway between the ends of the drum and extending at right angles to the rotational or longitudinal axis of the drum. With reference to FIG. 1A, the hubs 30 and 31 each comprise an inner cylindrical portion 34a slidably mounted on the shaft 11 and an annular flange 34b extending radially of the inner portion 34a from a point intermediate the ends thereof. The radially outer end of the flange 34b terminates in an outer second cylindrical portion 34c extending axially inwardly of the drum in radially spaced relation to the inner portion 34a to form an annular chamber 34 disposed concentrically of the drum axis.

A cam means assembly, generally illustrated at 35, including a pair of coaxially arranged pistons movable in axial directions is disposed in the annular chamber 34. In accordance with the present invention and with particular reference to FIG. 3, each cam means assembly 35 includes a first annular piston 36a and a second annular piston 36b with the piston 36a being disposed coaxially of and within the piston 36b. Mounted for movement with the respective pistons are cams 37a and 37b each comprising a conical surface or ramp 38a and 38b. The diameter of the radially outermost edge of the first conical surface 38a is substantially equal to the diameter of the radially innermost edge of the second conical surface 38b. The second piston 36b is movable axially with respect to the first piston 36a. The pistons 36a and 36b are sealably associated one with the other and within the annular chamber 34 by means of O rings 39a, 39b and 39c. When both pistons are in their axially outer positions against the axially outer flange 34b, the coaxially disposed ramps or conical surfaces 38a and 38b which have the same included angle with respect to the rotational axis of the drum are aligned to form one continuous ramp or conical surface. This alignment is maintained by an axially facing annular shoulder 40a on the radially outer side of the first piston 36a which abuts a corresponding axially facing annular shoulder 40b on the radially inner side of the outer piston 36b to prevent the conical surface 38b from moving axially inwardly over the radially inner conical surface 38a. Axially inward movement of the piston 36a is limited by a stop means 41b secured to the respectively associated hub 30 or 31 and engageable with the axially inner end 41a of the inner piston 36a.

The drum 10, as seen in FIGS. 1, 1–A, further comprises a pair of segment assemblies 42 and 43 each disposed in concentric relation around the longitudinal axis of the building drum 10, and each equally spaced in parallel relation from the centerplane CP of the building drum 10. The segment assembies 42 and 43 each comprises a housing 44 which is fixed to one of the hubs 30, 31. A plurality of bores 45 are provided in each of the housings 44 in equi-angularly spaced relation about the longitudinal axis of the drum. The bores 45 extend radially of the axis of the drum and are in communication with the annular bores 34 of the hubs 30, 31.

A lifter member or rod 46 is slidably received in each of the bores 45 for movement radially of the drum. Each lifter rod 46 carries at its inner end a roller 47 for rolling engagement with the cam assembly 35 when the associated pistons move in an axial direction towards the centerplane CP of the drum. A segment 48 is mounted on the outer end of each lifter member 46. Each segment has at its radially outermost extremity a generally parti-cylindrical rigid surface 50 for supporting rubberized plies of carcass material. The parti-cylindrical surfaces 50 are disposed with their axes parallel to the axis of the drum, and in this instance the term parallel is intended to include the case where the axes of the parti-cylindrical surfaces 50 are coincident with the rotational axis of the drum.

The parti-cylindrical surfaces 50 of each set 42 and 43 of segments cooperate to provide a generally cylindrical surface in both the radially inner and outermost position of the segments.

A generally cylindrical sleeve 55, composed of any suitable elastomeric material, e.g., rubber, is disposed coaxially of the drum. The sleeve is disposed over the segments 48 and is secured at its ends to the housings 44 by a pair of annular clamping rings 56 and 57, which are fastened to the housings 44. The clamping rings 56 and 57, each have a plurality of slots 58, which extend radially of the longitudinal axis of the drum. The slots 58 in each clamping ring 56, 57, preferably, correspond in number to that of the bores 45 formed in the respectively associated housings 44. The sleeve 55 is reinforced with axially extending cords and thus when the drum is radially collapsed and axially expanded effectively resists radially outer movement of the segments 48.

With reference to FIG. 1–1A, a bead gripping member or finger 59 is slidably mounted in each of the slots 58 of the clamping rings 56 and 57, for movement radially of the drum axis. The two sets of fingers 59 are equally spaced from the centerplane of the drum 10 a distance greater than are the segment assemblies 42 and 43. Each finger 59 is provided with a slot 60 extending at right angles to the next adjacent slots 58 in the next adjacent clamping ring, and the bases of the slots 58 are in sliding engagement.

With reference to FIG. 1, each finger 59 is provided with an arcuate groove 64 extending about the drum axis, with the grooves 64 of the other fingers in each set thereof forming a circular groove for receiving a spring, such as an O ring 65 composed of any suitable elastomeric material, e.g., rubber. The O ring 65 acts to bias the fingers 59 in a direction towards the longitudinal axis of building drum 10.

A plurality of levers or links 68 are each associated with, and pivotally mounted at one end on, one of a pair of mounting rings 70 secured between a flange on the hubs 30, 31 and the adjacent housings 44 of the segment assemblies 42 and 43. Each lever 68 is operatively associated with one of the fingers 59. A roller 71 is mounted on the free end 72 of each lever 68 for rolling engagement along the cams 37a and 37b. A second roller 73 is mounted intermediate the ends of each lever 68 and is engageable with the radially inner end of the respectively associated finger or member 59 to move the finger in a direction radially outwardly of the longitudinal axis of the building drum as the other roller 71 of the lever 68 is moved radially outwardly of the drum by the respectively associated cams 37a and 37b. Each finger 59 has at its radially outermost extremity a rigid parti-cylindrical material engaging surface 74, the axis of which extends parallel to the longitudinal axis of the building drum 10. It is intended to include within the use of the term parallel as applied to the axis of a surface 74 the situation wherein the axis is coincident with the drum axis. In the at rest position of the fingers 59, the surfaces 74 are spaced from the drum axis a distance not substantially greater than the surfaces 50 of the segments 48.

An arcuate groove 75 extending about the drum axis is provided in each finger 59 in radially inwardly spaced relation and in registry with the material engaging surface 74 with the groove facing axially outwardly of the drum. The clamping rings 56 and 57 each carry a projecting annular lug 76 for registry in an annular groove 77 formed in an adjacent turn-up bladder assembly 78 located at an outboard end of the drum. Each bladder assembly comprises an auxiliary drum 79, which is disposed coaxially of the building drum 10 and an annular extensible turn-up bladder 80 which is composed of a suitable elastomeric material, e.g., rubber. Each turn-up bladder 80 has an annular end or nose portion 81 projecting into the arcuate grooves 75 formed in the next adjacent set of fingers 59. The turn-up bladders 80 in their deflated condition have an outer diameter substantially the same as that of the rubber sleeve 55 disposed over the segments 48. Each bladder 80 is anchored relative to its auxiliary drum 79 at a location closely adjacent to but spaced axially outwardly from the axially inboard end of the bladder thus forming the nose portion 81.

A plurality, e.g., 12, of similar center segments or cover plates 84 are equi-angularly spaced around the longitudinal axis of the building drum 10, intermediate the segment assemblies 42 and 43. The cover plates 84 correspond in number to the segments 48 and fingers 59 and each consists of a parti-cylindrical member, the axis of which extends parallel to the longitudinal axis of the drum, and by parallel is meant to include coincidence with the drum axis. The cover plates 84 each have opposite ends 85 and 86, which are radially outwardly disposed in overlapped relation with respect to the adjacent segment 48. An operating piston 88, is associated with each cover plate 84 for moving the cover plate radially outwardly of the drum simultaneously with the respectively associated segments 48. The cover plates 84 provide support for the carcass plies between the segments 48, and together with the segments 48 provide a firm working surface on which the tire is built. The pistons 88 are respectively slidably engaged in a plurality of bores or cylinders extending radially inwardly of and from the outer periphery of an annular member 87 disposed coaxially over the shaft 11. The cover plates 84 being in overlapped relation with the segments 48, do not hinder movement of the segments 48 when the drive screw 13 is operated to move the hubs 30 and 31 toward and away from the centerplane of the building drum 10. The cover plates 84 preferably are sufficiently thin that the diameter of the center portion of the drum is not substantially greater than that of the end portions and yet sufficiently thick that the center portion provides a firm working surface for building the tire.

As shown in FIG. 2 air passages 102, 103, 104 and 105 are provided in the shaft 11 and extend longitudinally thereof. For the purpose of illustration, two of these passages 102 and 104 are shown in FIGS. 1–1A rotated from their actual position as shown in FIG. 2 into the plane of FIGS. 1–1A. The passages extend outwardly of the end of the shaft 11 which is supported by the head stock 9 for connection to suitable sources of pressurized air. The passage 104 extends substantially the full length of shaft 11. A pair of air hoses 94 are connected at one end to the passage 104 adjacent its ends, and at their other ends to the hubs 30 and 31 for supplying air to actuate the pistons 36a, 36b for effecting movement of the segments 48 and fingers 59. The annular member 87 housing the pistons 88 of the cover plates 84 is provided on its inner periphery with an annular groove 108 which communicates with the passage 104 and provides a manifold for the supply of air to actuate the pistons 88. A plurality of radially extending passages 106 in the member 87 provide communication between the manifold 108 and the pistons 88. The passage 105 extends substantially the full length of the shaft 11 as in the case of the passage 104, and is connected adjacent its opposite ends by hoses 93 to the bladders 80. The passage 102, as illustrated in FIG. 1, and in like manner the passage 103, terminates at its inner end adjacent the annular member 87 housing the pistons 88. More specifically, the inner end of each passage 102, 103 extends slightly beyond the annular member 87 and opens outwardly of the shaft 11 on both sides of the annular member 87. Accordingly, air pressure introduced through the passages 102, 103 will effect expansion of the sleeve 55. A blocking plate 107 serves to seal the manifold 108 in the annular member 87 from the passage 102, it being understood that there is a similar arrangement with respect to the passages 103, 105 in order to isolate the manifold therefrom.

With reference to FIG. 3, in the operation of the cam means assembly, the pistons 36a and 36b are originally in the axially outer positions adjacent the axially outer ends of the respective hubs 30 or 31. Each idler arm 68 is oriented with the radially inner roller 71 resting on the first cam means 37a, and the radially outer roller 73 engaged with the radially inner end of the respective finger 59. The lifter members 46 are in their radially inner position with respective rollers 47 resting on the inner surface 34a of the chamber 34. Although the levers 68 and rollers 47 do not lie in the same plane in the machine they have been rotated about the axis of the drum 10, as illustrated in FIGS. 3, 4 and 5 of the drawings, to appear in the same plane for the purpose of more clearly illustrating the operation of the cam assembly 35.

As seen in FIG. 4, a predetermined number of plies 95 are wrapped about the drum 10 and a bead ring 96 is located about each set of fingers 59. Air pressure is then introduced into the annular chamber 34 by means of conduit 94 and acts on both pistons 36a and 36b. Both pistons 36a and 36b initially move simultaneously axially inwardly lifting the idler arm 68 forcing the bead gripping members or fingers 59 radially outwardly. Since the radially inner roller 71 provides a certain amount of resistance to axial movement of the radially inner piston 36a during the initial movement of the pistons 36a and 36b and there is no significant resistance to the movement of the piston 36b, the annular shoulder 40b on the second piston 36b abuts against the annular shoulder 40a on the first piston 36a and maintains alignment of the conical surfaces 38a and 38b. As the pistons 36a and 36b continue to move axially toward the drum 10, the idler arm or roller 71 passes from the first cam means 37a to the second cam means 37b. When a predetermined force which is dependent upon the air pressure introduced into the chamber 34 is exerted radially outwardly against the beads 96, the axially inward movement of the piston 36b stops. The inner piston 36a continues to move axially inwardly toward the drum 10 until it engages the rollers 47 on the lifter arms 46. Since the drum 10 is in its axial expanded configuration and the sleeve 55 is stretched tightly over the segments 48, the lifter arms 46 are effectively prevented from moving radially outwardly and thus the axially inward movement of the piston 36a is terminated.

As seen in FIG. 5, the drum 10 is then axially contracted to its second position by activation of the screw 13. As the drum is being collapsed axially, the tension on the sleeve 55 is relieved and enables the inner piston 36a to again move axially inwardly and cause the roller 47 to roll up the cam 37a and force the lifter rods 46 radially outwardly, thus moving the segments 48 radially outwardly to the position as seen in FIG. 5 while maintaining the sleeve taught.

It can be seen that a predetermined radially outward pressure or gripping force is exerted on the beads 96 of the tire which is determined by the air pressure in the annular chamber 34 and the effective area of the piston 36b. If there is a slight variation in the diameter of the bead or more or less fabric plies are disposed between the bead and the fingers 59, the system automatically adjusts to such variations and still provides the same force against the beads. Further, it can be seen that since the limit of the axially inward movement of the inner piston 36a is determined by the stop means 41b, the radially outward movement of the lifter arm is always the same amount. If it is desirable to change the amount of the radially outward movement of the lifter arms, this can be accomplished by replacing the stop means or ring 41b with a ring of different axial length.

Thus there has been provided an improved tire building machine incorporating mechanisms for clamping the beads with a predetermined radial force and maintaining them in concentric relation to the longitudinal axis of the drum and in positions equally spaced from the centerplane of the building drum during substantially the entirety of the building operation, such that other components of the tire can be more accurately applied to the carcass plies.

While certain representative embodiments and details have been shown for the purpose of illustrating the invention, it will be apparent to those skilled in the art that various changes and modifications may be made therein without departing from the spirit or scope of the invention.

What is claimed is:

1. A tire building machine comprising a drum of a generally cylindrical configuration and having end portions which are radially expandable from a first diameter to a second diameter, bead gripping means disposed axially outwardly of and closely adjacent each end of the drum, each bead gripping means being expandable from a first diameter not substantially greater than the first diameter of said end portions to a second diameter substantially smaller than the second diameter of said end portions, and a pair of cams for expanding each said bead gripping means prior to expansion of said end portions, one cam of said pair of cams being wedgingly associated with said bead gripping means when said gripping means is expanded.

2. A machine as claimed in claim 1, wherein said pair of cams includes a pair of conical surfaces movable axially of the drum and relative to each other, said conical surfaces being operably associated with said bead gripping means to expand said bead gripping means when said conical surfaces are moved axially of said drum.

3. A machine as claimed in claim 1, further including means at each end of the drum forming an annular chamber disposed coaxially of the drum axis, a first and second piston disposed in each said chamber, said second piston being disposed coaxially about said first piston, the first cam of said pair of cams mounted for movement with said first piston and the second cam of said pair of cams mounted for movement with said second piston.

4. A machine as claimed in claim 3, wherein said first cam comprises a first conical surface and said second cam comprises a second conical surface with the radially outermost edge of said first conical surface having a diameter substantially equal to the diameter of the radially innermost edge of said second conical surface and further including means for locating said radially outermost edge closely adjacent said radially innermost edge.

5. A machine as claimed in claim 4, wherein said means for locating includes means associated with said pistons to limit the axial movement of said second piston relative to said first piston and prevent said second conical surface from moving axially over said first conical surface.

6. A machine as claimed in claim 5, further including means for exerting a predetermined axial force on said pistons to move said pistons axially of the drum and expand said bead gripping means, the radially outward movement of said bead gripping means thereby resulting in a predetermined gripping force being exerted on said bead.

7. A machine as claimed in claim 3, wherein one cam of said pair of cams effects the expansion of the end portion adjacent to the respective bead gripping means to said second diameter and further including means for restricting the radial expansion of said end portion during the expansion of said bead gripping means.

8. A machine as claimed in claim 7, further including means for stopping the axial movement of said first piston when said end portion expands to a predetermined diameter.

9. A machine as claimed in claim 8, wherein said first cam comprises a first conical surface and said second cam comprises a second conical surface with the radially outermost edge of said first conical surface having a diameter substantially equal to the diameter of the radially innermost edge of said second conical surface and further including means for locating said radially outermost edge closely adjacent said radially innermost edge.

10. A machine as claimed in claim 9, wherein said means for locating includes means associated with said pistons to limit the axial movement of said second piston relative to said first piston and prevent said second conical surface from moving axially over said first conical surface.

11. A machine as claimed in claim 9, further including means for exerting a predetermined axial force on said pistons to move said pistons axially of the drum and expand said bead gripping means and said end portions, the radially outward movement of said bead gripping means being limited by the bead surrrounding said bead gripping means thereby resulting in a predetermined 12. In a tire building machine of the type including a drum of generally cylindrical configuration and having radially expandable end portions and radially expandable bead gripping means disposed axially outwardly of and closely adjacent each end of the drum, the improvement comprising a pair of cams movable axially of the drum to radially expand each said bead gripping means, said cams being operably associated with said bead gripping means such that the axial movement of one of said cams is stopped by the reaction force of the bead gripping means engaging a bead ring with a predetermined gripping force.

13. The improvement as claimed in claim 12, wherein each cam includes a conical surface movable axially of the drum each said conical surface being operably associated with said bead gripping means to expand said bead gripping means when each said cam is moved axially of the drum.

14. The improvement as claimed in claim 13, further including means at each end of the drum forming an annular chamber disposed coaxially of the drum, a first and second piston disposed in each said chamber said second piston being disposed coaxailly about said first piston and wherein a first cam of said pair of axially movable cams is mounted for movement with said first piston and a second cam of said pair of axially movable cams is mounted for movement with said second piston.

15. The improvement as claimed in claim 14, wherein said first cam comprises a first conical surface and said second cam comprises a second conical surface with the radially outermost edge of said first conical surface having a diameter substantially equal to the diameter of the radially innermost edge of said second conical surface and further including means for locating said radially outermost edge closely adjacent said radially innermost edge.

16. The improvement as claimed in claim 15, wherein said means for locating includes means associated with said pistons to limit the axial movement of said second piston relative to said first piston and prevent said second conical surface from moving axially over said first conical surface.

17. The improvement as claimed in claim 16, further including means for preventing the radial expansion of said end portions during the expansion of said bead gripping means.

18. The improvement as claimed in claim 17, further including means for exerting a predetermined axial force on said pistons to move said pistons axially of the drum and expand said bead gripping means and said end portions, the radially outward movement of said bead gripping means being limited by the bead surrounding said bead gripping means thereby resulting in a predetermined gripping force being exerted on said bead.

19. The improvement as claimed in claim 18, further including means for limiting the axial movement of said first piston to limit the expansion of said end portions to a predetermined diameter.

20. The improvement as claimed in claim 19, wherein the included angle between said first conical surface and the rotational axis of the drum is the same as the included angle between said second conical surface and the rotational axis of the drum.

* * * * *